Patented Sept. 12, 1933

1,926,442

UNITED STATES PATENT OFFICE 1,926,442

PRODUCTION OF SULFONIC ACIDS OF ALIPHATIC AND HYDROAROMATIC CARBOXYLIC ACIDS

Fritz Günther and Josef Hetzer, Ludwigshafen-on-the-Rhine, Germany, assignors to I. G. Farbenindustrie Aktiengesellschaft, Frankfort-on-Main, Germany, a corporation of Germany No Drawing. Original application June 7, 1927, Serial No. 197,223, and in Germany June 9, 1926. Divided and this application April 10, 1928. Serial No. 269,023

5 Claims. (Cl. 260—112)

The present invention relates to the production of sulfonic acids of aliphatic and hydroaromatic carboxylic acids.

The application has been divided out from our copending application for the production of sulfonic acids of aliphatic and hydroaromatic hydrocarbons, Ser. No. 197,223, filed June 7, 1927.

We have found that non-aromatic, which means aliphatic and hydroaromatic carboxylic acids of high molecular weight, namely such as contain more than 8 carbon atoms in their molecule, or their derivatives can be converted into sulfonic acids by treatment with sulfonating agents under energetic conditions. That means that either stronger sulfonating agents than sulfuric acid such as sulfuric acid anhydride, fuming sulfuric acid, or chlorosulfonic acid should be employed, at room temperature or elevated temperatures, or when using concentrated sulfuric acid, the treatment should be carried out at temperatures of at least 100° C. The action of the sulfonating agents may take place either in the presence or absence of diluting media which are not sulfonated under the conditions of working, such as nitrobenzene, or carbon tetrachlorid, or of catalysts, for example phosphoric anhydride, diatomaceous earth, active carbon and the like, or both.

The sulfonic acids thus obtained, which are true sulfonic acids containing the group

in contradistinction to the so-called aliphatic and hydroaromatic sulfonic acids hitherto known which are sulfuric acid esters and contain the group

and also the salts of the new sulfonic acids are excellent wetting, emulsifying, cleansing and dissolving agents for a great variety of substances and are also excellently suitable for use as fat saponifiers. The new sulfonic acids and sulfonic acid salts are soluble in water and many organic liquids and produce solutions having in high degree the properties of giving lather, of wetting and emulsifying. They are very stable against the action of halogen. Above all they possess the property of not being decomposed by acids and constituents of hard water, so that they can be employed even in the presence of acids, or calcium and magnesium salts, as for instance in acid baths for dyeing, fulling, carbonization and the like. It is chiefly by this property that the new compounds differ from Turkey red oils and similar sulfuric acid esters.

The new products can also be employed for the production of clear aqueous solutions of organic substances which are insoluble or not miscible with water, such as hydrocarbons, water-insoluble alcohols, ketones, esters and other insoluble or difficultly soluble organic compounds, for example of benzene, tetrahydronaphthalene, petroleum hydrocarbons, butyl or amyl alcohols, cyclohexanol, cyclohexanone and the like. The ammonium salts of the sulfonic acids are especially suitable for this purpose. In order to obtain such clear (probably colloidal) solutions, rather definite proportions of the ingredients must be employed, which proportions vary according to the nature of the sulfonic acid or sulfonic acid salt employed and of the organic substance to be dissolved and can readily be ascertained by some tests. For example, a clear solution is obtained by mixing 5 parts, by weight, of cyclohexanol with 10 parts, by weight, of an aqueous solution of mono-sodium sulfo-oleate containing about 27 per cent of carbon which corresponds to about 5 parts, by weight, of the said salt. The clear solutions thus obtained can be employed for a great variety of purposes; they are particularly suitable for the production of aqueous emulsions which may often be obtained from the solutions for example by diluting with water.

The sulfonic acids according to the present invention, insofar as they are derived from carboxylic acids of aliphatic hydrocarbons of comparatively low molecular weight, can be made more suitable for the said purposes of application, if alkyl, aralkyl, or aryl groups are introduced into the sulfonic acid molecules or into the original, unsulfonated compounds, from which the sulfonic acids are made. The introduction of alkyl, aralkyl or aryl groups into the sulfonic acids of aliphatic carboxylic acids is also often advantageous when the latter have a comparatively high molecular weight.

Suitable initial materials for the production of the new compounds are for example oleic, stearic, palmitic acids or esters thereof with mono- or polyvalent alcohols such as myricil alcohol or glycerol, octohydro-anthracene and the like.

The following examples will further illustrate how our invention may be carried out in practice, but the invention is not limited to these examples. The parts are by weight.

*Example 1*

450 parts of chlorosulfonic acid are allowed to run slowly at about 75° C., while efficiently stirring, into 142 parts of stearic acid. When the evolution of gas begins to cease, the mass is heated to about 100° C. After the sulfonation is complete, the reaction product which is now soluble in water, is poured into water, and filtered off, while hot, from the small amount of undissolved matter. On cooling, a gelatinous mass is obtained, which on dilution with water gives solutions possessing good lathering and wetting properties.

The reaction proceeds according to the equation

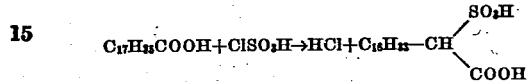

Aqueous solutions of the salts of the sulfonic acids thus obtained also possess strong soap-like properties. The alkali metal salts of the sulfonic acid are for instance obtained by neutralization of the free acid with alkalies, but may also be produced by way of the intermediarily prepared calcium salt. Diluents such as, for instance, carbon tetrachloride may also be present in the production of sulfonic acid. Oleic acid may be analogously employed in the place of stearic acid.

Example 2

Molten palmitic acid is treated at about 100° C. while stirring, with sulfuric acid anhydride, until the reaction product becomes soluble in water. A syrupy product is thus obtained, which on cooling turns into a semi-solid mass, the acid, neutral or alkaline aqueous solutions of which have excellent soap-like properties. The reaction proceeds according to the equation

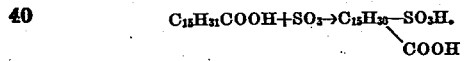

Example 3

Between 1 and 2 parts of the product obtained by the treatment of palmitic acid at 100° C. with sulfuric acid anhydride until the reaction product is soluble in water, are dissolved in 100 parts of water. A liquid capable of producing a very good lather is thus obtained, which wets wool, cotton and the like very rapidly and effectively.

The sulfonic acids obtained from stearic acid or mixtures of stearic acid and palmitic acid may be employed in the same way. The neutral or alkaline solutions of the said sulfonic acids also possess excellent wetting properties.

Example 4

282 parts of oleic acid are stirred with 300 parts of nitrobenzene and treated at about 5° to 10° C. with 160 parts of sulfur trioxid, for which about 5 to 6 hours are required.

The nitrobenzene is distilled off with steam and the product neutralized with alkali so that it no longer shows acid reaction with congo. The reaction proceeds according to the equation:

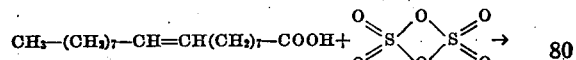
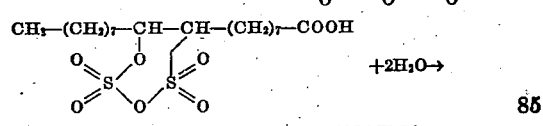
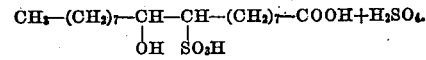

An excellent wetting agent is thus obtained, which can be employed in acid liquids as well as in neutral or alkaline solutions. Other unsaturated compounds such as the fatty acids of train oils, train oils themselves and the like may be employed in place of oleic acid.

What we claim is:

1. The process of producing sulfonic acids derived from non-aromatic hydrocarbon carboxylic acids containing more than 8 carbon atoms in their molecule which comprises treating said non-aromatic hydrocarbon carboxylic acids with a sulfonating agent stronger than concentrated sulphuric acid at a temperature between room temperature and 100° C.

2. The process of producing sulfonic acids derived from aliphatic saturated hydrocarbon carboxylic acids containing more than 8 carbon atoms in their molecule which comprises treating said aliphatic hydrocarbon carboxylic acids with a sulfonating agent stronger than concentrated sulphuric acid at a temperature between room temperature and 100° C.

3. The compounds of manufacture α-sulphonic acids of aliphatic saturated hydrocarbon carboxylic acids containing more than 8 carbon atoms in their molecule which contain the group

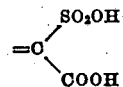

are stable against acids and hard water, and possess good wetting and emulsifying properties.

4. The compound of manufacture palmitic α-sulphonic acid which contains the group

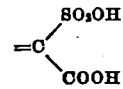

is stable against acids and hard water, and possesses good wetting and emulsifying properties.

5. The process of producing a true sulfonic acid which comprises treating a fatty acid selected from the class consisting of palmitic and stearic acids at a temperature ranging from room temperature to 100° C. with a sulfonating agent selected from the class consisting of chlorosulfonic acid, fuming sulfuric acid, and sulfuric acid anhydride.

FRITZ GÜNTHER.
JOSEF HETZER.